Figures 1, 2, 3:
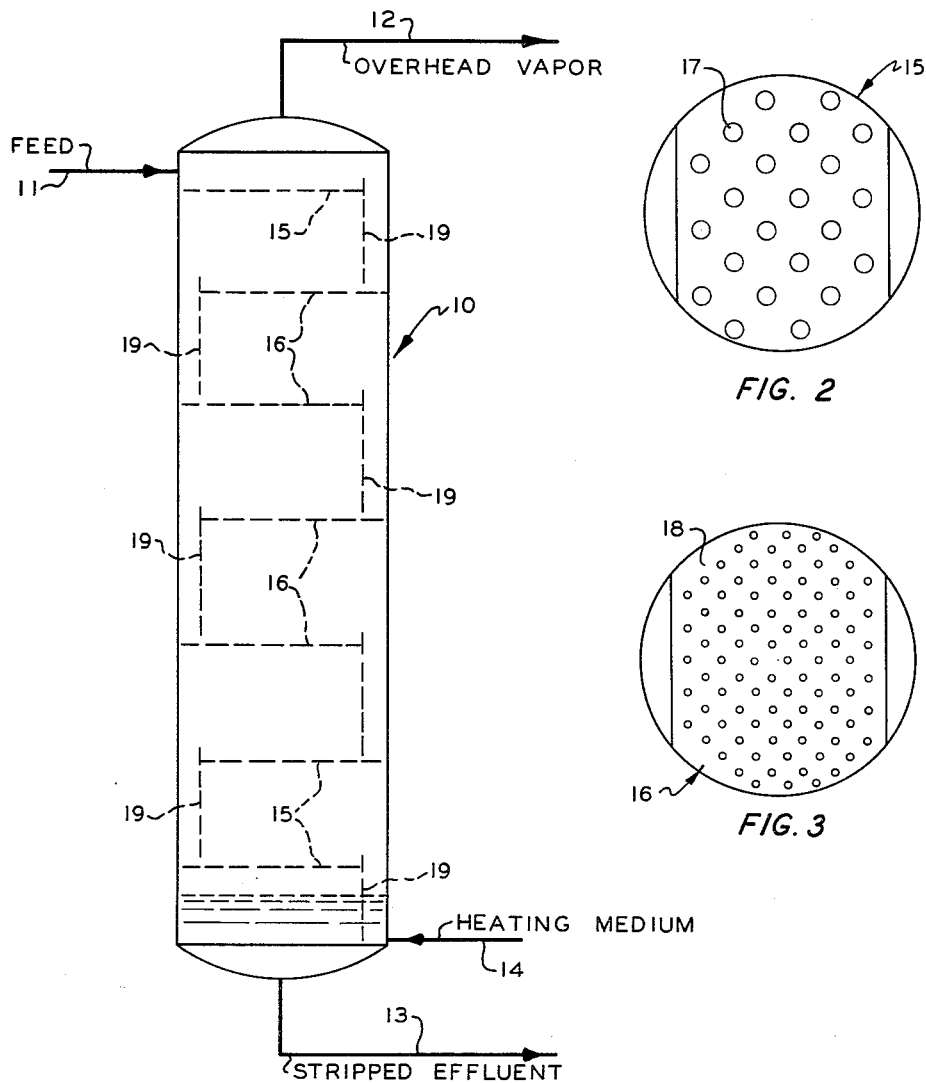

INVENTORS
N.F. MC LEOD
R.N. CARLSON
BY
ATTORNEYS

United States Patent Office 3,143,482
Patented Aug. 4, 1964

3,143,482
SEPARATION APPARATUS
Norman F. McLeod, Nederland, and Rollin N. Carlson, Borger, Tex., assignors to Phillips Petroleum Company, a corporation of Delaware
Filed Jan. 9, 1961, Ser. No. 81,369
5 Claims. (Cl. 202—234)

This invention relates to an improved separation apparatus. In one aspect, this invention relates to apparatus for separation of a more volatile fluid from a mixture containing it and a less volatile fluid along with suspended solids. In another aspect, this invention relates to apparatus for stripping a volatile fluid from a mixture containing same, a less volatile fluid, and suspended solids. In still another aspect, this invention relates to apparatus for separating styrene from a reactor effluent containing it, along with a reaction medium and a suspended polymer pre-floc.

In the separation of a multi-component liquid mixture in the presence of a suspended solid, problems have been encountered in the past by plugging of the trays by the solids in the separation column. This is especially true where, in an operation such as stripping, the suspension of solids is introduced into an upper region of a stripping column and is countercurrently contacted with a heating medium such as steam, which has been introduced into a lower portion of the same column. There is often a tendency for the liquid as it is introduced into the upper portion of the column to foam, this foaming and the suspension of solids aggravating the plugging condition. A heating or stripping medium such as steam is often introduced into the lower portion of the column, and although this heating medium is generally superheated, there may be times when it is not. This has the effect of "plastering" suspended solids onto the bottom of the lower trays, thus plugging the perforations.

A process which is fairly common in industry is the homopolymerization or copolymerization of styrene in an emulsion system. According to this process, after polymerization the reactor effluent is stripped of unreacted monomer. This can be conveniently accomplished in a stripping column having several substantially horizontal perforated trays therein. However, this reactor effluent obtains some pre-flocculated polymer, and in the past, this polymer has had a tendency to plug the tray perforations in an upper portion of the column, and also in the very lower end of the column. It is desirable, for maximum contacting efficiency, to utilize perforations having as small a size as practicable. On the other hand, it has been necessary in the past to utilize trays having larger perforations than most efficient in order to prevent the plugging problem heretofore mentioned.

We have now discovered an optimum arrangement of trays in such a stripping operation. We have discovered that a proper balance between stripper efficiency and plugging tendency can be found by providing trays at the upper and lower ends of such a stripping column having large perforations, and providing intermediate trays having smaller perforations.

It is an object of this invention to provide an improved separation apparatus. It is another object of this invention to provide improved apparatus for separating a more volatile fluid from a mixture containing it, a less volatile fluid, and a suspended solid. It is another object of this invention to provide an improved apparatus for separation of unreacted styrene by stripping a styrene polymerization effluent in a stripping column having perforated trays, the perforations in the upper and lower trays being larger than the perforations in the intermediate trays.

Other aspects, objects, and the several advantages of the invention will be apparent to one skilled in the art upon reading the disclosure, the drawing, and the appended claims.

According to the invention, there is provided a means for separating a more volatile fluid from a mixture containing it, a less volatile fluid, and suspended solids comprising means for countercurrently contacting said mixture with a heating medium in a vertically elongated contact zone, the contact zone being further subdivided into smaller contact zones by a plurality of horizontally-disposed partitions having fluid passageways therethrough, the passageways in at least an upper and a lower of the partitions being larger than the passageways in at least an intermediate partition; means for withdrawing at least a portion of the more volatile fluid from an upper of the smaller contact zones; and means for withdrawing at least a portion of the less volatile fluid from a lower of the contact zones, whereby plugging of the passageways in an upper and a lower of the partitions by the suspended solids is reduced.

Also, according to this invention, there is provided a separation apparatus comprising a substantially vertical elongated vessel having arranged therein a plurality of substantially horizontal perforated trays, the trays having larger perforations in at least a top tray and a bottom tray than the perforations in at least one intermediate tray; fluid inlet means communicating with an upper portion of the vessel; fluid withdrawal means communicating with an upper portion of the vessel; and a second fluid withdrawal means communicating with a lower portion of the vessel.

FIGURE 1 is an elevational view of the apparatus of this invention, and FIGURES 2 and 3 are details of the perforated tray thereof.

Referring now to FIGURE 1, there is provided a stripping column 10. The feed, which is usually liquid but can contain some vapor as well as solids, is introduced by conduit 11 to the upper region of stripping column 10. Stripped vapors are taken overhead by conduit 12 for further utilization in the process. The effluent, from which vapors have been stripped, is removed from column 10 by conduit 13. A heating medium such as steam is introduced by conduit 14 to a lower portion of column 10. The column is provided with a series of contacting devices such as represented by 15 and 16. In a preferred embodiment of the invention, these contacting devices comprise substantially horizontally arranged perforated trays. Downcomers are positioned on the side of each tray to provide a passage for fluid to move from an upper tray to a lower tray or into the bottom of column 10. Each downcomer extends above the tray to which it is attached to form a dam over which the fluid flows and to maintain a fluid level on the tray. Each downcomer extends under the fluid level that is below the tray to which it is attached, to keep vapors from flowing up through the downcomer. Such trays are detailed in FIGURES 2 and 3. Trays 15 are provided with perforations 17 which are of a relatively large size, while trays 16 are provided with perforations 18 which are of a relatively small size. In FIGURE 1, there are provided one tray 15 having large perforations at the top of the column and two trays 15 having large perforations at the bottom of the column, while the intermediate trays 16 have smaller perforations.

The invention will now be more fully described with reference to the following specific example.

Reactor effluent from a copolymerization of styrene and butadiene, containing about four percent unreacted styrene and about 20–27 percent solids comprising mainly preflocculated polymer was introduced to the top of the stripping column. This column is about 54 feet high and 9 feet in diameter, and contains twelve trays on 33 inch spacing. The column was operated with a feed rate of about 60 gallons per minute. The top temperature of this column ranged from 110–120° F. at a pressure of about 50 millimeters of mercury, while the bottom temperature ranged from about 140° to 150° F. at a pressure of about 150 millimeters of mercury The stripped effluent contained about 0.02 of one percent of styrene. Before installation of the trays of this invention, this column operated from 1,000 to 1,400 hours between cleanings. These cleanings were necessary because of plugging of the tray perforations in the top and the bottom regions of the column, and occasionally caused such an increase in pressure drop across the trays that these trays would be dislodged during operation. The trays, which were originally all provided with $3/16$ inch diameter holes, were replaced with a top tray having one inch diameter holes and two bottom trays having one inch diameter holes, the intermediate trays having $3/16$ inch diameter holes being retained. After replacement of these trays, no tendency to plug has been experienced. It is estimated that the column will operate for at least 2,500 hours until plugging is experienced.

In a preferred embodiment of the invention, the trays comprise substantially planar sheets drilled with random or geometrically arranged holes. However, other liquid-vapor contacting devices are within the scope of this invention. Although the invention has been described in connection with stripping styrene from a polymerization effluent, it is apparent that the invention is applicable in various instances to the stripping separation of a multi-component mixture having a solids suspended therein. The free area of the trays in the foregoing example comprised about 5.7 percent; this ratio was relatively constant throughout all of the trays of the column. Variations in the free area ratio of the tray throughout the column are also within the scope of this invention.

Reasonable variations and modifications are possible within the scope of the foregoing disclosure, the drawing, and the appended claims to this invention, the essence of which is that there are provided a method and apparatus for separation of a multi-component liquid having solids suspended therein comprising contacting the mixture with a stripping medium in a column having perforated trays, the perforations in the upper and lower regions of the column being larger than those in the center.

We claim:

1. Separation apparatus comprising a substantially vertical, elongated cylindrical vessel having arranged therein at least three substantially horizontal perforated trays, at least an upper and a lower of said trays having larger perforations than any of the perforations in at least one intermediate tray; fluid inlet means operatively communicating with said vessel at a point above said upper tray; fluid outlet means operatively communicating with said vessel at an upper end thereof; a second fluid outlet means operatively communicating with said vessel at a lower end thereof; and heating means disposed in said lower end thereof.

2. The apparatus of claim 1 wherein said larger perforations are about one inch in diameter and said perforations in said at least one intermediate tray are about $3/16$ of an inch in diameter.

3. The apparatus of claim 1 wherein said heating means comprises a second fluid inlet means operatively communicating with said lower end.

4. The apparatus of claim 1 wherein the ratio of perforation area to total area in all of said trays is approximately equal.

5. The apparatus of claim 4 wherein said ratio is in the range of about one to sixteen to about one to eight.

References Cited in the file of this patent

UNITED STATES PATENTS

| | | |
|---|---|---|
| 55,076 | Eayrs | May 29, 1866 |
| 1,728,440 | Otto | Sept. 17, 1929 |
| 2,927,065 | Gerlicher et al. | Mar. 1, 1960 |
| 2,973,189 | Ju Chin Chu | Feb. 28, 1961 |